(12) United States Patent
Imbrock et al.

(10) Patent No.: US 8,723,944 B1
(45) Date of Patent: May 13, 2014

(54) SYSTEM FOR DETECTING CONDUCTIVE COATINGS ON NON-CONDUCTIVE MEDIUM SURFACES

(75) Inventors: Mark A. Imbrock, Sylvania, OH (US); Jeffrey A. Simpson, Wayne, NE (US); Jed Martens, Wayne, NE (US); Nathan Strimpel, Milan, MI (US)

(73) Assignee: EDTM, Inc., Toledo, OH (US)

( * ) Notice: Subject to any disclaimer, the term of this patent is extended or adjusted under 35 U.S.C. 154(b) by 898 days.

(21) Appl. No.: 12/891,384

(22) Filed: Sep. 27, 2010

Related U.S. Application Data (60) Provisional application No. 61/246,428, filed on Sep. 28, 2009, provisional application No. 61/246,436, filed on Sep. 28, 2009.

(51) Int. Cl.
H05K 13/08 (2006.01)
G01N 27/22 (2006.01)

(52) U.S. Cl.
USPC .......................... 348/87; 324/663

(58) Field of Classification Search
USPC .......................................... 348/87
See application file for complete search history.

(56) References Cited

U.S. PATENT DOCUMENTS

| | | | | |
|---|---|---|---|---|
| 4,831,493 A * | 5/1989 | Wilson et al. | | 361/286 |
| 5,132,631 A * | 7/1992 | Klopfenstein et al. | | 324/676 |
| 5,309,240 A | 5/1994 | Miwada | | |
| 5,528,402 A * | 6/1996 | Parker | | 349/139 |
| 5,748,091 A * | 5/1998 | Kim | | 340/583 |
| 5,966,214 A * | 10/1999 | Imbrock et al. | | 356/632 |
| 6,094,981 A * | 8/2000 | Hochstein | | 73/170.17 |
| 6,683,695 B1 | 1/2004 | Simpson et al. | | |
| 7,353,711 B2 * | 4/2008 | O'Dowd et al. | | 73/718 |
| 7,385,710 B1 * | 6/2008 | Sturgill | | 356/632 |
| 7,417,749 B1 | 8/2008 | Simpson et al. | | |
| 7,499,165 B2 | 3/2009 | Simpson et al. | | |
| 7,525,658 B1 | 4/2009 | Simpson et al. | | |
| 7,583,368 B1 | 9/2009 | Simpson et al. | | |
| 7,652,760 B1 | 1/2010 | Simpson et al. | | |
| 7,855,549 B2 * | 12/2010 | Renken et al. | | 324/750.3 |
| 2013/0293246 A1* | 11/2013 | Pollack et al. | | 324/671 |

* cited by examiner

*Primary Examiner* — Sath V Perungavoor
*Assistant Examiner* — Howard D Brown, Jr.
(74) *Attorney, Agent, or Firm* — MacMillan, Sobanski & Todd, LLC (57) ABSTRACT

Methods and apparatuses for detecting the presence and/or location of any conductive coating on a non-conductive medium surface are described.

57 Claims, 2 Drawing Sheets
(1 of 2 Drawing Sheet(s) Filed in Color)

SYSTEM FOR DETECTING CONDUCTIVE COATINGS ON NON-CONDUCTIVE MEDIUM SURFACES

CROSS-REFERENCE TO RELATED APPLICATION

The present invention claims the benefit of the provisional patent application Ser. No. 61/246,428 filed Sep. 28, 2009 and 61/246,436 filed Sep. 28, 2009, which are expressly incorporated herein by reference.

TECHNICAL FIELD

This invention relates to an apparatus and a method for detecting the presence and location of a conductive coating on a non-conductive medium surface. In particular, the conductive coatings can be detected on surfaces on non-conductive materials, or mediums (e.g., glass or plastic) that have varying thicknesses and/or gap separations in assemblies of two or more such materials.

In another aspect, the invention relates to a system for providing an improvement in the accuracy of thickness measurements of such medium using a charge coupled device (CCD) linear image array provides an energy carryover effect from one sensor element to another sensor element.

BACKGROUND

It is often helpful in the glass industry, as well as other transparent medium industries, to detect the presence and surface location of conductive coatings that are applied to the surface of the non-conductive medium. Some of these coatings are classified as low emissivity (low E) coatings. These coatings are typically not visible and therefore difficult to detect without electronic assistance.

The Klopfenstein U.S. Pat. No. 5,132,631 (which was assigned to the same assignee as the present invention), can be used for identifying the presence of the coating on the medium. It has been found, however, that in situations where two mediums are separated by a gap (for example, a dual pane window assembly), the Klopfenstein '631 device must be calibrated for a pre-determined range within a narrow range of gap thicknesses for a given thickness of the mediums. One limitation of Klopfenstein '631 device is that the calibrated ranges for glass and gap thickness are quite narrow and do not aptly cover the variations that are experienced in the glass industry. This is of concern since the flat glass industry generally utilizes glass from about 2.2 mm up to about 10 mm. For example, flat glass used in residential applications is typically in the 2.2 mm to 4 mm range, while flat glass used in commercial applications is typically in the 5 mm to 10 mm range. In addition, in all of these applications, there is also a large variation in the gaps that are placed between the two substrates. Typical gaps in the flat glass market ranges from ¼" to ⅞".

Another limitation of the Klopfenstein '631 device is that it is difficult to achieve the desired accuracy of measurements when glass thickness and gap separating the two mediums vary from application to application. That is, different combinations of glass and gap thicknesses cause the resulting Klopfenstein-measured values to overlap from coated to uncoated test samples, causing the Klopfenstein '631 device to yield incorrect results. This is illustrated in FIG. 1 which contains a chart showing a variety of capacitance measurements with a variety of glass and gap thickness combinations.

Figure 1:
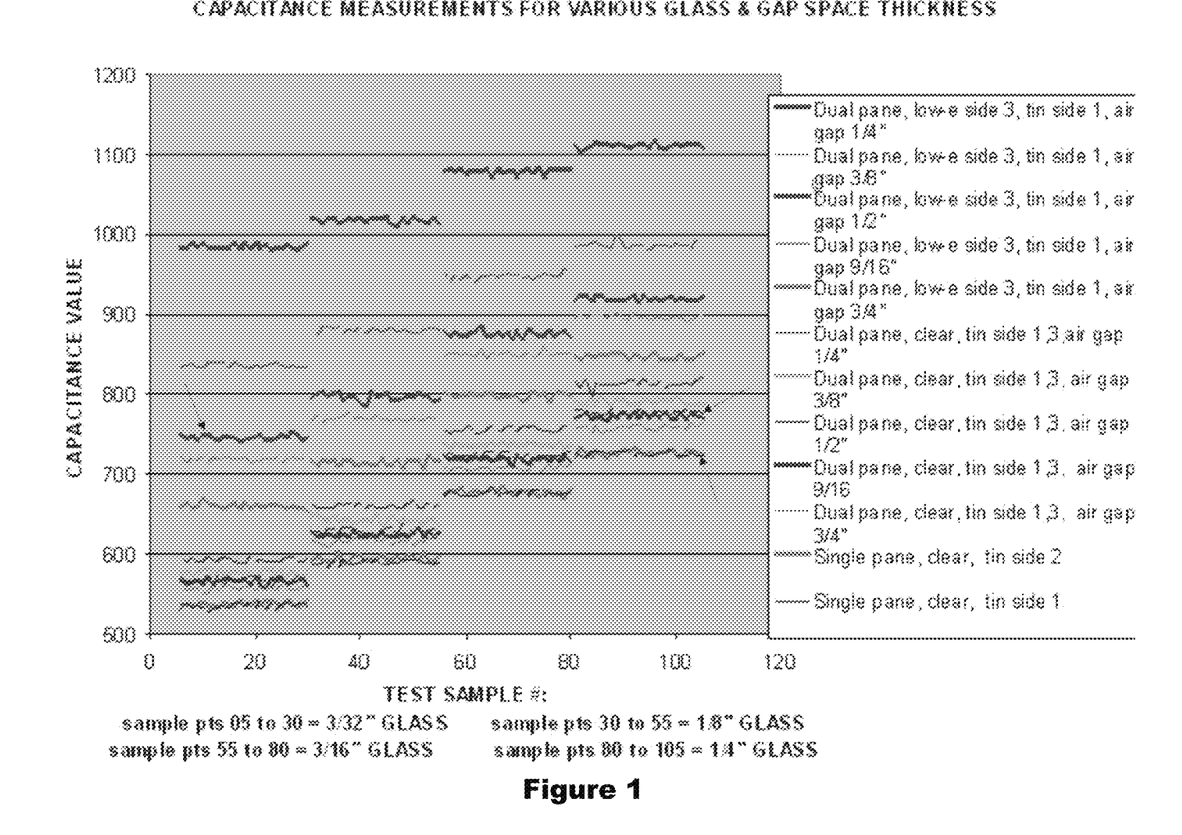
FIG. 1 is a chart showing capacitance measurements for various thicknesses of a medium and widths of any gaps between the mediums.

FIG. 1 clearly shows the number of applications that overlap causing incorrect test results to occur when using the Klopfenstein '631 device. That is, the Klopfenstein '631 device is unable to differentiate the correct results across a variance in glass or gap thickness. For example, if the Klopfenstein '631 device is calibrated to measure ³⁄₃₂" glass, but the user is testing ¼" glass, the measured capacitance values from varying glass and gap thicknesses overlap, causing incorrect test results from the calibrated invention.

FIG. 1 also shows that two pieces of ³⁄₃₂" glass with a low E coating resting on surface 3 of the 4 possible surfaces (where two pieces of glass are separated by an gap of ½") (see arrow of left side of chart), will result in a capacitance value of 750. In the case where a Klopfenstein '631 device that is calibrated to measure ³⁄₃₂" glass, such device would correctly indicate the coating is on the FAR surface.

However, in another example, a single piece of ¼" glass will result in a capacitance value of 725 (bottom arrow on right), while two pieces of ¼" CLEAR glass separated by ½" will result in a capacitance value of 775 (top arrow on right). This then indicates that the single piece of ¼" glass has a capacitance below the ³⁄₃₂" double pane example, while the ¼" double pane clear combination has a capacitance above the ³⁄₃₂" double pane example.

These examples illustrate that different thicknesses of glass, as well as different numbers of glass panes, both coated and uncoated can all result in similar capacitance values that cannot be sufficiently differentiated by the Klopfenstein '631 device. Thus, for both of the ¼" combinations of glass, the Klopfenstein '631 device would incorrectly identify these glass combinations as also have a coating on the FAR surface.

Consequently, the Klopfenstein '631 device is not capable of differentiating the correct low E surface location across a mix of glass and gap thicknesses.

It is to be noted that the glass combinations chosen for the example above are extremely common in the flat glass industry. It is also to be noted that these examples would apply to additional sensing techniques beyond capacitive plates, such as inductive sensors.

Therefore, there is a continuing need for an improved, reliable and efficient method and device to detect the presence, location and type of coating applied to various media.

BRIEF SUMMARY OF THE INVENTION

This invention generally relates to a system for detecting conductive coatings on one or more surfaces of non-conductive mediums. The system generally includes a method and an apparatus for detecting a conductive coating on a non-conductive medium having a defined thickness, which comprise: i) measuring capacitance of at least one conductive coating on at least one surface of one or more non-conductive medium; ii) comparing the measured capacitance data of step i) with the thickness of the one or more non-conductive medium; and, iii) identifying the presence and surface location of the at least one conductive coating on the surface of the non-conductive medium.

Various objects and advantages of this invention will become apparent to those skilled in the art from the following detailed description of the preferred embodiment, when read in light of the accompanying drawings.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the Patent Office upon request and payment of the necessary fee.

DETAILED DESCRIPTION OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein.

The system described herein is useful to readily and accurately detect conductive coatings on one or more surfaces of non-conductive mediums. The system is also useful to detect such coatings on mediums that have varying thicknesses, and further, to detect such coatings on structures that contain multiple mediums that may have varying gap distances/separations between the various mediums of the structure. Non-limiting examples of such measurable media include, for example, but are not limited to one or more of: architectural windows with or without coatings or layers of light-altering materials; coated films on glass or plastics; glass such as automobile windows, adjustable darkness glass, user adjustable privacy glass, eyeglass lenses; plastics such as windows, storage containers; and, transparent metal layers such as those found in photovoltaic devices and solar panels.

The invention relates generally to detecting the presence, location and type of coating applied to various transparent mediums, or materials, where such coating(s) is deposited directly to the surface or left on the transparent mediums during the manufacturing process (such as glass or plastic), and where such coating(s) may be on a single sheet of the medium and/or multiple spaced sheets of the medium. It is to be understood that the multiple spaced sheets may be comprised of the same or different types and/or thicknesses of mediums.

In the coating industry, there also are numerous applications where coatings are applied to a transparent surface. Some of these applications include flat glass, windows, LCD screens, solar cell panels, thermal efficient films, as well as many other plastic and glass applications. During the processing of these flat materials, it is often desirable to have an apparatus that is able to detect the presence and location of the "invisible" coatings. The coatings may be located on one or both surfaces of a single piece of the medium, or on one or more surfaces of multiple pieces of the medium materials built into an assembly, separated by a known transparent media such as air or a gas.

In one aspect, the invention relates generally to an improvement in the Klopfenstein U.S. Pat. No. 5,132,631, which is owned by the assignee herein and which patent is fully and expressly incorporated herein by reference.

System for Detecting Conductive Coatings on Surfaces of Non-Conductive Medium

Described herein is a system that is now capable of identifying both: i) the thicknesses of the non-conductive mediums, and ii) the width of the gap between adjacent mediums. The detection system is especially useful with many different types of products and is capable of making accurate measurements concerning the conductive coatings on such mediums.

Since the detection system includes measuring additional information on the medium thickness and the gap width, the detection system herein is capable of handling many more variations that are found in the field.

The detection system first identifies the glass thickness, then accessing calibration data for the designated glass thickness and compares the calibration data against a data set containing stored "known" values. The method also includes the step of comparing the calibration data against the variations in gap widths in the multi-pane assembly.

It is to be understood that various suitable algorithms or mathematical techniques for generating and/or processing the final result output signal can be used. Further, the detection system may be controlled and/or operated by conventional control and/or operational systems, including, but not limited to various software instructions and/or programs. It is to be understood that such instructions and programs are readily available to, or readily programmable, without undue experimentation from the descriptions as provided herein. It is to be understood that the detection system described herein can be used with one or more software programs which include calibration data that compare all possible combinations of single and/or multi-pane glass assemblies. By having this data stored in the software, the system described herein can accurately detect and/or measure work across a greater variance in glass and gap combinations.

Figure 2:
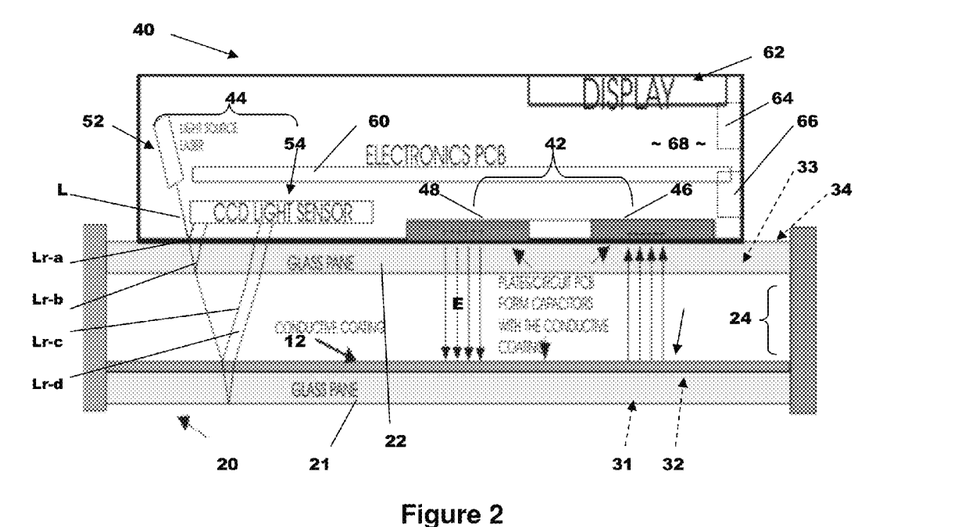
FIG. 2 is a schematic illustration of an apparatus for detecting a coating on a non-conductive medium.

Referring now to FIG. 2, there is schematically illustrated a detection system 10 for detecting the presence and location of one or more coatings on at one or more non-conductive mediums.

In the embodiment illustrated in FIG. 2, an assembly 20, such as a dual pane window assembly, is shown as including a first medium 21 in a spaced apart relationship to a second medium 22. It is to be understood that the mediums 21, 22 can be part of a multi-pane window assembly, such as a triple pane window assembly, etc., and that the dual-pane assembly 20 shown in FIG. 2, is only shown for ease of explanation.

The first and second mediums 21 and 22, respectively, are separated by a gap 24. It is to be understood that such gap between may contain air, a gas (e.g., argon, krypton, etc.), or, in some configurations, a vacuum.

In the embodiment illustrated in FIG. 2, the assembly 20 includes four (4) surfaces: the first medium 21 has a first (or, outer) surface 31 and a second (or, inner) surface 32, and the second medium 22 has a third (or, inner) surface 33 and a fourth (or, outer) surface 34. In the schematic illustration in FIG. 2, the second (or, inner) surface 32 of the first medium 21 is depicted as having a coating 12 in order to aid in the explanation of the invention herein.

In the embodiment illustrated in FIG. 2, the detection system 40 generally includes a capacitance-measuring sensor 42 and a thickness-measuring (e.g., reflection) sensor 44. The capacitance-measuring sensor 42 and the thickness-measuring sensor 44 are used to detect (and then confirm) the presence and location of a coating 12 on the one or more surfaces of mediums 21 and/or 22. It is to be understood that the detection system 40 can be configured such that the capacitance-measuring sensor 42 and the thickness-measuring sensor 44 are operated substantially simultaneously, or are operated in a sequential manner.

The capacitance-measuring sensor 42 can generally include opposing plates 46, 48 (shown in FIG. 2 as "plates/circuit PCB) that form capacitors with the conductive coating 12 as follows: the capacitance-measuring sensor 42 directs an electric field E, shown by arrows E, from one plate 46 through the second medium 22, through the gap 24, and toward the first medium 21 and the coating 12. The electric field E thus passes through the coating 12, and back to the opposing plate 48 such that an electric circuit is completed. Thus, depending on the signals detected, the capacitance-measuring sensor 42 determines whether any coating 12, is in fact present, and further determines the location of the coating 12 (i.e., on the inner/outer surfaces and/or on the first/second mediums).

In certain embodiments, the thickness-measuring sensor can comprise one or more of an ultrasonic sensor and/or a light sensor. In the embodiment illustrated in FIG. 2, the thickness-measuring sensor 44 includes a light source 52 and one or more light sensing elements 54. The light source 52 directs one or more beams of light energy, shown by line L, through the second medium 22, the gap 24 and the first medium 21. The light L can comprise any light having a desired wavelength which can be modified, depending on end-use requirements. The light source 52 can be aligned to direct one or more light beams L at a predetermined angle, for example, at about 30 degrees. It is to be understood that various suitable sources of light energy can be used herein. Non-limiting examples include LEDs, IR (infra-red) laser, although other suitable light sources may be used.

Reflections of the light beam L from the light source 52 are measured on the one or more light sensor elements 54. In certain embodiments, the light sensor element 54 can be comprised on one or more linear (charged coupled device) CCD arrays. The light sensor element 54 is able to determine reflected energy from multiple reflecting surfaces (i.e., the first and second surfaces 31, 32 of the first medium 21 and the third and fourth surfaces 33, 34 of the second medium 22).

Reflected light energy, shown by lines Lr-a, Lr-b, Lr-c, Lr-d from the first and second mediums 21, 22 and the coating 12 is reflected back to the light sensing elements 54.

As illustrated in FIG. 2, a portion Lr-a of the beam L is reflected by the fourth surface 34 of the second medium 22 back to the light sensor element 54. For the reflected beam Lr-a, the angle of incidence with the fourth surface 34 of the second medium 22 will equal the angle of the reflection back towards the light sensor element 54.

As the light L passes through the second medium 22, the light L contacts the third (inner) surface 33 of the second medium 22, and a portion Lr-b of the light beam L is reflected by the third surface 33 of the second medium 22 back to the light sensor element 54.

A further portion of the beam L portion is refracted into the next medium (i.e., the gap 24) and contacts the coating 12 on the second surface 32 of the first medium 21. A reflected beam Lr-c is reflected back to the light sensor element 54.

A still further portion of the beam L portion is passes through the coating 12 and is refracted into the first medium 21. A reflected beam Lr-d is reflected from the first surface 31 back to the light sensor element 54.

It should be appreciated that the spacing between the light source 52 and the light sensor element 54 will depend on the angle of the light beam L relative to the surfaces 31, 32, 33, 34 of the first and second mediums 21, 22 and the width of the gap 24 between the first and second mediums 21, 22. For example, if the angle of incidence between the light beam L and the fourth surface 34 of the second medium 22 increases from 30° to 45°, the spacing between the light source 52 and the points that the reflected beams Lr-a, -b, -d, -d impinge on the light sensor element 54 also will increase.

It is to be understood, that in certain embodiments, filters (not shown) may be incorporated into the path of the incident light L and/or reflected beams Lr. The filters reduce the influence of ambient light by passing the beams and blocking passage of much of the ambient light. Also, the reflected beams Lr may be filtered to remove various light frequencies before they impinge on the light sensor element 54. The light sensor element 54 can include an array of elements (e.g., pixels) which detect the location, and strength of each reflected beam Lr. For example, the light sensor element 54 may be one or more photosensors or a CCD (charged coupled device) array.

The photosensors may be, for example, of a type which produce an analog signal having an output magnitude which is a function of the energy detected in the reflected light beam or of a type which produces a signal having a frequency which is a function of the detected energy in the reflected light beam.

Referring again to FIG. 2, the locations and strengths of the reflected beam Lr are fed into a processor 60 (such as, for example, a programmed microcontroller, microprocessor or computer 60 (generally shown in FIG. 2 as an electronics PCB (printed circuit board)) for evaluation. Although the following description refers to the microprocessor 60, it should be noted that the invention is not limited to any particular type of programmed device and that the programming may be by software, firmware or hard wiring. The microprocessor 60 mathematically evaluates the characteristics of each reflected beam Lr. An algorithm that can incorporate location, peak values, intensity and weightings of each sensing element in the light sensor element 54 that is affected by the reflected beam determines the presence and location of the coating 12. It is to be understood that multiple concentrated light sources may be used to define the type of coating, in addition to coating presence and location of such coating.

Further, in certain embodiments, the electronics or program data for the microprocessor 60 may be pre-calibrated; and in other embodiments, may be "trained" in the field. For repeating applications, thresholds may be determined that can be set prior to shipping the detection system 40 to the customer for a specified application. For varying conditions, the detection system 40 may be delivered to the customer without any preset thresholds. Once in use, the detection system 40 can be used with various types of mediums and appropriate data can stored for each type of medium. For example, such variations could include single and multiple panes of glass with no surface coatings and with coatings on different surfaces. The microprocessor 60 can store the variations in memory, and can then be able to identify each type of medium by comparing the refraction data for the medium with the stored data. For example, depending on the desired information, the microprocessor 60 may use any combination of the following reflection data: slope relationship of multiple frequency light sources; the absolute value of the reflected signals due to different surfaces of the medium under test; the ratio of reflected energy from each surface of the medium under test; and/or the absolute power amounts of multiple surface reflections that have combined together on a linear type sensing array.

Once the detection system 40 has evaluated the beam reflections Lr, the results can be displayed via various indicators on a control or display panel 62. In addition, or alternately, one or more output ports 64 can be provided on the detection system 40 to supply data to an outside processor (not shown).

Also, in certain embodiments, the detection system 40 can further be configured for collecting information about the number of sheets of mediums (e.g., glass panes) being tested. For example, the collection of information on the number of sheets can be done with the detection system 40 itself. In another example, the number of sheets of the medium(s) can be manually entered into the detection system 40 via the control or display panel 62. For example, in certain embodiments, the knowledge that there is one versus two panes, could prevent the detection system 40 from wrongly registering a "FAR" condition when there is no far pane of glass, causing the meter to default to a "CLEAR" reading (i.e., correctly).

Also, in certain embodiments, the light source 52 can provide light L having different frequencies and/or wavelengths. Light from the different wavelength light sources will be reflected differently by different surface coatings. In other words, although two different coating materials may reflect the same magnitude or weighting of light at one light wavelength, they will reflect different magnitudes or weightings of light at a different light wavelength. The light source(s) 52 and/or light sensor element(s) 54 can be arranged so that light from each source which is reflected by the mediums and/or coatings impinge on a particular sensor and can be independently measured. Further, if a single light sensor element 54 is provided for two or more different wavelength light sources, the light source(s) 52 can be alternately pulsed on so that the light sensor element(s) 54 detect(s) the energy level in reflected light from only one frequency light source 52 at a time.

It should be appreciated that there are alternate ways for measuring the reflected energy level at different wavelengths. For example, LED's are available which can be operated to produce light having either of two different colors. By switching the light source between different wavelengths, the light sensor element 54 can measure the energy level in the surface reflections at the different wavelengths. Alternately, the light source 52 may produce a broad spectrum of wavelengths. Different filters (not shown) may be used for selectively passing to the light sensor element 54 reflections of different wavelengths or of different bands of wavelengths in the surface reflections.

Also, in certain embodiments, when multiple light sensor elements 54 are provided, the outputs from the light sensor elements 54 are combined to produce reflected energy data for each wavelength. The total reflected energy for one wavelength may be used to determine if one or more of the reflected amplitude signals indicates the presence, location, and/or type of a coating.

Thus, the reflected light Lr is used not only to determine whether the coating 12 is present, but also to measure the thickness of the first and second mediums, the width of the gap between the first and second mediums, and/or the thickness of the coating 12. Thus, if the coating 12 is present, the angle of the reflected light and the receiving of energy Lr indicates the location of the coating 12.

The measured reflected energy Lr from each surface 31, 32, 33, 34 determines the presence and location of the coating 12. The resulting measured reflected energy is then correlated with the capacitance-measuring sensor 42 to determine the type of coating; for example, whether the coating 12 is a conductive LOW E coating or a non-conductive self-clean coating. Since LOW E coatings are conductive, if the LOW E coating is present, the capacitance-measuring sensor 42 will detect it. The capacitance-measuring sensor 42 cannot detect a non-conductive coating. Therefore, the results from the capacitance-measuring sensor 42 are used in correlation with the light sensor element 54.

The detection system 40 thus uses the capacitance-measuring sensor 42 in correlation with the thickness-measuring sensor 44 to determine coating location(s), conductivity, type(s) of coatings, and analytical value(s). For example, the peak values, intensity and weightings of each sensing element in the thickness-measuring sensor 44 can be determined. Also, as previously indicated herein, other measurements from the reflection data: slope relationship of multiple frequency light sources; the absolute value of the reflected signals due to different surfaces of the medium under test; the ratio of reflected energy from each surface of the medium under test; and/or the absolute power amounts of multiple surface reflections.

In certain embodiments, the detection system 40 can either include or be in communication with a computer system (not shown) configured to analyze results generated by the thickness-measuring sensor 44 and the capacitance-measuring sensor 42. In certain embodiments, the values may be taught to a microcomputer by testing samples of the different coatings and of different surface coating locations for various samples of glass or other transparent material and for various commercial composites. The presence, location and/or type of a coating are determined by comparing the surface reflection energy levels with the stored information for the different samples.

Also, in certain embodiments, the detection system 40 described herein can be useful across varying temperature ranges. In certain embodiments, the detection system 40 can further include a temperature sensor 66 that can be operatively connected to the microprocessor 60. The temperature sensor 66 can be monitored to verify the temperature of the detection system 40 and/or ambient environment and adjust the resulting measurement based on known correction values over a range of temperature values. This temperature monitoring allows the detection system 40 to maintain its calibration accuracy over a wide range of temperature.

Also, in certain embodiments, the sensing plate(s) 46, 48 can be part of the capacitance-measuring sensor 52 itself. When measuring systems are moved from cold environments to warm environments, it is not uncommon for condensation to build up on the sensing plate or electronics. The conductive property of water can have detrimental effects on the resulting capacitive signal that is generated. In certain situations, the condensation can impact the calibration of the instruments and cause incorrect measurement results to occur. Also, in certain embodiments, the detection system 40 can include a protective material 68, such as foam, insulation and/or desiccant material, that substantially fills a space around at least the sensing plate(s) 46, 48 and/or the electronics 60.

Also described herein is a method for detecting a conductive coating on a non-conductive medium, where the method includes: i) quantitatively measuring capacitance of a conductive coating on one or multiple sheets of a non-conductive medium; ii) comparing the measured capacitance of step i) with a quantitative measurement of at least the thickness of the non-conductive medium; and, iii) identifying the presence and surface location of one or more conductive coatings on any surface of the non-conductive medium.

In another aspect, there is provided herein a method for detecting a conductive coating on a non-conductive medium, where the method includes: i) generating a first capacitance for any conductive layer present on a first surface of a first medium; ii) generating a second capacitance for any conductive layer present on a second surface of the first medium; iii) generating a third capacitance for any conductive layer on a third or a fourth surface of a second medium; and iv) generating a fourth capacitance for the absence of any conductive coatings.

In certain embodiments, the method can further include measuring the width of a gap between adjacent mediums and comparing such width with the measured capacitance of step i).

In certain embodiments, the method includes comparing: a) at least one measured capacitance data value (and/or any results that occur from a changing capacitance value) to b) a range of stored capacitance data values and/or trigger points that correspond to the measured medium thickness.

In certain embodiments, the method includes using the measured medium thickness data and/or gap width data to: i) select an appropriate representation of the stored value of the capacitance data and/or trigger point for the medium thickness, and ii) identify the presence and location of a conductive coating on the medium.

In certain embodiments, the method can include electronically measuring data on the medium thickness and/or the gap width, and collecting the electronically measured data within the same instrument and/or a different instrument. In other embodiments, the method can include independently measuring and/or manually entering data on the medium thickness and/or gap width using a user interface control panel. In still other embodiments, the method can include pre-programming known capacitance data associated with a given thickness(es) of the medium(s) and any gap widths.

In certain embodiments, the method can include: calibrating one or two thicknesses of the medium wherein, by calibrating with one or more known capacitance values and/or trigger points, the method can obtain valid results for the given thicknesses of the medium(s) and/or width of the gap (s).

In certain embodiments, the method can include accumulating and storing (e.g., through in-field use) additional capacitance values for the medium(s) being tested.

In certain embodiments, method can include measuring the temperature of the medium environment and/or the electronics being used (e.g., a capacitance-measuring sensor 42 and/or a thickness-measuring sensor 44). The method can also include: measuring a temperature of one or more of: the non-conductive medium: an environment in which the non-conductive medium is present; a sensor configured for measuring the capacitance; and sensor configured for measuring the thickness of the non-conductive medium. Also, the method can include measuring the temperature of the medium's environment and the electronics substantially simultaneously during the measuring of the capacitance values. In certain embodiments, the method can include adjusting one or more corresponding capacitive measurements based on the thermal response to yield a test result that is not impacted by varying temperature.

In certain embodiments, the method can further include substantially minimizing environmental moisture and/or condensation on the surface of the non-conductive medium from affecting accuracy of the measured capacitance.

In still other embodiments, the method for detecting a conductive coating on a non-conductive medium having a defined thickness, can comprise:
  i) determining whether capacitance values can be measured; and, if any capacitance values are measured,
  ii) correlating any determined capacitance values with the defined thickness of the non-conductive medium;
  iii) identifying the presence of at least one conductive coating on at least one surface of the non-conductive medium; and if one or more conductive coatings are present; and,
  iv) determining on which surface of the non-conductive medium that the conductive coating is located.

In still other embodiments, a method for detecting a conductive coating on a non-conductive medium, can include:
  i) quantitatively measuring capacitance of a conductive coating on one or multiple sheets of a non-conductive medium;
  ii) quantitatively measuring a thickness of one or multiple sheets of the non-conductive medium;
  iii) comparing the measured capacitance of step i) with the measured thickness of step iii); and,
  iv) identifying the presence and surface location of one or more conductive coatings on one or more surfaces of the non-conductive mediums.

Adjustable Power CCD

In use, the detection system 40 is positioned flat against the surface of one medium so that the light energy L strikes the medium's front and back surfaces and reflecting back onto the light sensor. In the embodiment illustrated in FIG. 2, the light sensor element 54 is depicted as a CCD array and the reflections Lr-a,-b,-c,-d are measured by the pixel elements of the CCD array. The results of the measured reflections are forwarded to the microprocessor 60 which can store the calibration data to know the true distance between the reflections that are measured by the CCD array to yield the resulting thickness of the medium. The distances between the different measured reflections on the CCD array are converted into the actual thickness of the medium being tested.

It is important to realize that different mediums and/or gaps will result in different indexes of refraction that will, in turn, shift or alter the reflecting angle of the energy source and the reflections as they pass from medium to gap space boundaries. When the medium and gap space indexes of refraction are known and/or measured, the detection device 40 can yield accurate thickness measurements for both the gap space and the medium.

There are different types of linear image sensors (CCD arrays) that can be used where each CCD array allows the pixel elements to measure a limited amount of energy for each measurement cycle. Some CCD array designs allow the pixel elements to capture up to some maximum energy level, and then allow the excess energy to carry forward or "bleed over" to the next charge coupled pixel element. Other CCD array designs isolate each pixel element so that no, or limited, energy is allowed to be transferred from one pixel element to the next. Typically, the isolated pixel element CCD array designs are more expensive than the CCD arrays that allow energy to be carried over from one saturated element to the next. Therefore, there is a need for a more efficient and cost effective device that can use a CCD array in a detection system in order to keep the costs at a lower level, while still providing for accurate thickness measurements.

One difficulty that arises with CCD arrays that allow the pixel elements to carry over the energy, is that the reflected energy intersection point with the CCD array can become skewed due to the excess energy. In one such example, the CCD array was calibrated to know that a given distance between reflection points on the CCD array would yield a calculated thickness of the medium being tested. When excess energy was present in the individual pixel elements, the extra energy was carried over to the next pixel element. This accumulation of excess energy then had a negative effect on the results.

This is of concern since, when the excess energy carries over from pixel element to pixel element in the light sensor element, the resulting "peaks" of energy being measured by the CCD array begin to grow larger and larger in width. This increase in peak widths causes the accuracy of the instrument to be jeopardized. The more narrow the peak, the more exact the location the center of the peak can be determined. The wider the peak, the more variance that results in calculating the center of the peak.

Another concern with the carryover CCD arrays, is that the energy is not spread equally to the peaks on either side of the center pixel that is at the heart of the reflected energy. In certain cases, the energy flows to the next pixel element in the CCD array to be measured, favoring one side of the center pixel. This results in the calculated center of the peak to shift further down the CCD array, resulting in additional errors in the thickness measurement. This error holds true for whatever method of "peak center" one chooses to use, whether it is: a simple mathematical average of the pixels involved to find the center; the weighted average that takes the intensity and location into account to find the center; or, a simple edge detection method of the reflected peak.

Thus, another aspect of the present invention relates to a system that provides an improvement in a CDD linear image array that is configured to control one or more of the following parameters: i) the intensity of the light energy from an energy source (e.g., laser); ii) the amount of time the light energy is supplied to the medium; iii) the ability to adjust the sensitivity of the CCD linear image array; and, iv) the ability to adjust the shutter speed of the CCD linear image array.

The system described herein is configured to control the intensity of the peaks measured by the CCD linear image array. By ramping up the intensity, it is possible to monitor the peak intensities as such peak intensities grow in connection with the increasing power and/or time and/or sensitivity and/or shutter speed.

In certain embodiments, by starting at a lower concentration, the system (using, for example, a microprocessor) can monitor the growing intensities of the peaks as the energy is ramped up. The system determines that the peaks are of substantial intensity that such peaks justify a legitimate reflection, but catches such peaks before they saturate or reach a non desired level of energy collection for that individual pixel element. The system prevents spilling over of energy into the next pixel element, or entering any other undesirable state, so that one can achieve maximum accuracy for the carryover style of CCD linear image arrays.

In another aspect, there is provided herein a method for measuring thickness of a medium using a charge coupled device (CCD) linear image array having a plurality of sensor elements. The method includes regulating energy carryover effects from one sensor element to another sensor element in the CCD linear image array.

In a particular aspect, the method includes:
a) regulating energy carryover effects by:
   a-1) controlling intensity of energy from an energy source as the energy is directed to the medium; and/or
   a-2) adjusting sensitivity of the CCD linear image array as the energy source is directed to the medium; and/or
   a-3) adjusting shutter speed of the CCD linear image array as the energy is directed to the medium;
b) monitoring the intensity of reflections of the energy from the medium onto the CCD linear image array; and,
c) substantially preventing the measured energy reflections of step b) from saturating or entering any other undesirable state, wherein the energy reflections have a peak reflection having a center, and
d) substantially preventing the center of the peak reflection and/or the peak reflection itself from shifting onto one or more adjacent pixel elements in the CCD linear image array when the measurement is performed.

In a particular aspect, there is provided herein a system for improving thickness measurements of transparent medium using a CCD linear image array that allows each pixel element's excess energy to be transferred to the pixel elements next to it.

The resolution and accuracy of the resulting measurements are improved by: adjusting the sensitivity of the CCD linear image array, and monitoring the intensity of the energy reflections. The system substantially prevents the measured reflections on the CCD linear image array from saturating or entering any non-desirable state, prevents causing the center of the peak reflection to shift on the CCD linear image array, and thus prevents an error in the thickness measurement.

The system improves the resolution and accuracy of the resulting measurements by:
a) controlling the intensity of the light energy;
b) monitoring the intensity of the energy reflections; and
c) substantially preventing:
   i) the measured reflections on the CCD linear image array from saturating pixel elements, or having the pixel elements entering any other undesirable state; and/or
   ii) the center of the peak reflection and/or the peak reflection itself from shifting on the CCD linear image array into an undesirable state; and/or,
   iii) an error in the thickness measurement.

In certain embodiments, an improvement in the thickness measurements is obtained by using a linear CCD linear image array that allows each pixel element's excess energy to be transferred to the adjacent pixel elements.

Figure 3:
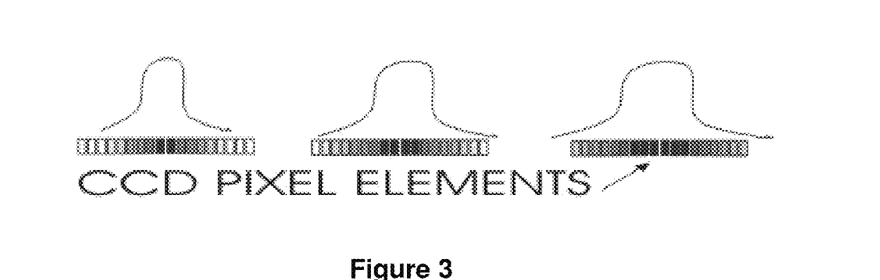
FIG. 3 is a schematic illustration of CCD pixel elements.

Referring now to FIG. 3, each curved graphs represents a light energy scale showing the amount of light energy reflected, and each block represents a CCD pixel (sensor) element where the darker blocks represent more energy received/stored by that pixel element. The energy stored is related to the length of time the light source is turn on and the amount of reflected energy that is received by that CCD pixel element.

In certain embodiments, the method can determine the thickness where the average thickness is resolved by taking the mathematical average of the pixel elements involved in the peak that is generated by the energy source reflection on the medium being measured. That is, in certain embodiments, the average thickness can be resolved by taking the mathematical average of any, or all, of the pixel elements involved in the peak that are generated by the energy source reflection on the medium being measured. For example, the average thickness can be resolved by measuring the weighted average from the intensity of any, or all, of the pixel element and the elements location in the CCD linear image array in order to find the center of the reflected peak generated by the energy source reflection on the medium being measured.

Also, in certain embodiments, the average thickness can be resolved by measuring the weighted average (that takes the intensity of each pixel element and the elements location in the CCD linear image array into account) to find the center of the reflected peak generated by the energy source reflection on the medium being measured.

In another aspect, there is provided herein an apparatus for improving thickness measurements of a medium using a CCD linear image array that allows each pixel element's excess energy to be transferred to one or more adjacent pixel elements. The apparatus improves the resolution and accuracy of the resulting measurements by i) adjusting the shutter speed of the CCD linear image array, and ii) monitoring the intensity of the energy reflections.

While the invention has been described with reference to a preferred embodiment, it should be understood by those skilled in the art that various changes may be made and equivalents may be substituted for elements thereof without departing from the essential scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this

What we claim is:

1. A method for detecting at least one conductive coating on at least one non-conductive medium having a defined thickness, comprising:
   i) measuring capacitance of at least one conductive coating on at least one surface of the at least one non-conductive medium;
   ii) comparing the measured capacitance data of step i) with the thickness of the at least one non-conductive medium; wherein the step ii) includes comparing:
      a) at least one measured capacitance value and/or any results that occur from a changing capacitance value, to
      b) a range of stored capacitance value data and/or trigger point(s) that correspond to the medium thickness; and,
   iii) identifying the presence and surface location of the at least one conductive coating on the surface of the non-conductive medium.

2. The method of claim 1, wherein step ii) includes measuring the thickness of the non-conductive medium.

3. The method of claim 1, when the non-conductive medium comprises two or more sheets of the non-conductive medium, and the method further includes:
   iv) correlating the measured capacitance data of step i) and the thickness of the non-conductive medium with a width of a gap between the two or more sheets of the medium.

4. The method of claim 1, wherein the method includes accumulating and storing additional capacitance values for one or more non-conductive mediums.

5. The method of claim 1, wherein the method includes:
   generating and measuring a first capacitance for any conductive layer present on a first surface of a first non-conductive medium;
   generating and measuring a second capacitance for any conductive layer present on a second surface of the first non-conductive medium;
   generating and measuring a third capacitance for any conductive layer on a third or a fourth surface of a second non-conductive medium; and
   generating a fourth capacitance for the absence of any conductive coatings.

6. The method of claim 1, wherein the method includes:
   independently measuring and/or manually entering data on the medium thickness and/or gap width.

7. The method of claim 1, wherein the method includes pre-programming known capacitance data associated with a given thickness(es) of the medium(s) and any gap widths.

8. The method of claim 1, wherein the method includes: calibrating one or two thicknesses of the medium wherein, by calibrating with one or more known capacitance values and/or trigger points, the method can obtain valid results for the given thicknesses of the medium(s) and/or width of the gap(s).

9. The method of claim 1, wherein the method includes: substantially minimizing environmental moisture and/or condensation from affecting accuracy of the measured capacitance.

10. The method of claim 1, wherein two or more non-conductive mediums are present in an assembly.

11. The method of claim 2, wherein step ii) includes measuring the thickness of the non-conductive medium using an ultrasonic sensor and/or a light sensor.

12. The method of claim 3, wherein the method includes measuring the width of the gap between adjacent mediums and comparing such width with the measured capacitance of step i).

13. The method of claim 11, wherein the method includes using data comprising the medium thickness(es) and/or data comprising the gap width(s) to:
   i) select an appropriate representation of the stored capacitance value data and/or trigger point(s) for the medium thickness, and
   ii) identify the presence and location of at least one conductive coating on the non-conductive medium.

14. The method of claim 11, wherein the method includes electronically measuring the medium thickness and/or the gap width, and optionally, collecting the electronically measured medium thickness and/or the gap width within a single apparatus or in a different instrument.

15. A method for detecting at least one conductive coating on at least one non-conductive medium having a defined thickness, comprising:
   i) measuring capacitance of at least one conductive coating on at least one surface of the at least one non-conductive medium;
   ii) comparing the measured capacitance data of step i) with the thickness of the at least one non-conductive medium; and,
   iii) identifying the presence and surface location of the at least one conductive coating on the surface of the non-conductive medium;
   wherein the method includes:
      measuring a temperature of one or more of: the non-conductive medium; and an environment in which the non-conductive medium is present.

16. The method of claim 15, wherein the method includes measuring the temperature of the medium's environment substantially simultaneously during the measuring of the capacitance.

17. The method of claim 15, wherein the method includes adjusting one or more corresponding capacitive measurements based on the measured temperature to yield a test result that is not impacted by varying temperature.

18. An apparatus for detecting the presence and surface location of at least one conductive coating on at least one surface of at least one non-conductive medium, comprising
   a capacitive-measuring sensor configured to generate a capacitance value in the presence of a conductive layer on a surface of at least one non-conductive medium; and
   a processor configured for identifying the presence and surface location of one or more conductive coatings on at least one surface of the non-conductive medium by correlating a value of the capacitance measured with the thickness of the non-conductive medium; wherein the processor is configured for comparing:
   i) at least one measured capacitance value and/or any results occurring from a changing capacitance value, to
   ii) a range of stored capacitance values and/or trigger points corresponding to the thickness of the non-conductive medium.

19. The apparatus of claim 18, further including a thickness-measuring sensor configured to measure the thickness of the at least one non-conductive medium.

20. The apparatus of claim 18, wherein the processor is configured for:
   i) collecting and/or storing the measured capacitance values, and optionally, measured thicknesses, within the apparatus; and/or ii) collecting; and/or storing the measured capacitance values, and optionally, measured thicknesses, at one or more devices remote from the apparatus.

21. The apparatus of claim 18, wherein the processor is configured for independently measuring and/or allowing for manual entering of data on the thickness of the non-conductive medium and/or any gap width between adjacent non-conductive mediums.

22. The apparatus of claim 18, wherein the processor is configured for accepting a known capacitance value associated with a given thickness of the non-conductive medium and any width of a gap between adjacent non-conductive mediums.

23. The apparatus of claim 18, wherein the processor is configured for accumulating and/or storing additional data comprised of measured capacitance values for various non-conductive mediums.

24. The apparatus of claim 19, wherein the thickness-measuring sensor is further configured to measure a width of a gap between two adjacent non-conductive mediums.

25. The apparatus of claim 19, wherein the thickness-measuring sensor comprises an ultrasonic sensor.

26. The apparatus of claim 19, wherein the thickness-measuring sensor comprises a light sensor.

27. The apparatus of claim 24, wherein the processor is configured for further correlating the width of the gap with the measured capacitance value.

28. The apparatus of claim 19, wherein the processor is configured for electronically measuring the thickness of one or more non-conductive mediums and a width of any gap separating adjacent non-conductive mediums.

29. An apparatus for detecting the presence and surface location of at least one conductive coating on at least one surface of at least one non-conductive medium, comprising
  a capacitive-measuring sensor configured to generate a capacitance value in the presence of a conductive layer on a surface of at least one non-conductive medium; and
  a processor configured for identifying the presence and surface location of one or more conductive coatings on at least one surface of the non-conductive medium by correlating a value of the capacitance measured with the thickness of the non-conductive medium; and
  a temperature sensor configured for measuring temperatures of one or more of: the non-conductive medium; an environment in which the non-conductive medium is present; a sensor configured for measuring the capacitance; and sensor configured for measuring the thickness of the non-conductive medium;
  wherein the temperature sensor is configured for measuring the temperature of the medium and the environment substantially simultaneously during the measuring of the capacitance values.

30. An apparatus for detecting the presence and surface location of at least one conductive coating on at least one surface of at least one non-conductive medium, comprising
  a capacitive-measuring sensor configured to generate a capacitance value in the presence of a conductive layer on a surface of at least one non-conductive medium; and
  a processor configured for identifying the presence and surface location of one or more conductive coatings on at least one surface of the non-conductive medium by correlating a value of the capacitance measured with the thickness of the non-conductive medium; and
  a temperature sensor configured for measuring temperatures of one or more of: the non-conductive medium; an environment in which the non-conductive medium is present; a sensor configured for measuring the capacitance; and sensor configured for measuring the thickness of the non-conductive medium;
  wherein the processor is configured for adjusting one or more corresponding capacitive measurements based on a measured thermal response to yield a test result that is not impacted by varying temperatures.

31. The apparatus of claim 18, wherein the capacitance-measuring sensor comprises sensing plates that are configured to form an electric circuit with a conductive coating, when present.

32. The apparatus of claim 18, further including a moisture protective material that substantially fills a space around the sensing plates.

33. The apparatus of claim 32, wherein the moisture protective material comprises one or more of foam, insulation and/or desiccant material.

34. A method for measuring thickness of a medium using a charge coupled device (CCD) linear image array having a plurality of sensor elements, the method comprising regulating energy carryover effects from one sensor element to another sensor element;
  wherein the method includes:
  a) regulating energy carryover effects by:
    a-1) controlling intensity of energy from an energy source as the energy is directed to the medium; and/or
    a-2) adjusting sensitivity of the CCD linear image array as the energy source is directed to the medium; and/or
    a-3) adjusting shutter speed of the CCD linear image array as the energy source is directed to the medium;
  b) monitoring the intensity of reflections of the energy from the medium onto the CCD linear image array; and,
  c) substantially preventing the measured energy reflections of step b) from saturating or entering any other undesirable state, wherein the energy reflections have a peak reflection having a center, and
  d) substantially preventing the center of the peak reflection and/or the peak reflection itself from shifting onto one or more adjacent pixel elements than desired on the CCD linear image array when the measurement is performed.

35. The method of claim 34, wherein an average thickness of the mediums being measured is resolved by taking the mathematical average of any, or all, of the sensor elements comprising the peak reflection.

36. The method of claim 34, including determining the average thickness by measuring the weighted average from the intensity of any, or all, of the sensor elements.

37. The method of claim 34, including finding the center of the reflected peak by determining the location of one or more of the sensor elements in the CCD linear image array.

38. The method of claim 34, including allowing the excess energy of one sensor element to be transferred to one or more adjacent sensor elements.

39. The method of claim 34, including controlling the amount of time the energy source directs energy onto the medium.

40. The method of claim 34, including substantially preventing the measured reflections on the CCD linear image array from saturating the CCD linear image array at particular locations on the CCD linear image array when the thickness measurement is being performed.

41. The method of claim 34, including substantially preventing the center of the peak reflection to shift on the CCD linear image array.

42. The method of claim 34, wherein the CCD linear image array comprises a CCD linear image array that allows each sensor element's excess energy to be transferred to an adjacent sensor element.

43. The method of claim 34, further including measuring an average thickness of gap spaces between adjacent mediums.

44. An apparatus for measuring a thickness of a medium, comprising a charge coupled device (CCD) array comprised of a plurality of sensor elements, the apparatus being configured to regulate energy carryover effects from one sensor element to another sensor element;
   an energy source, a sensor comprised of the CCD linear image array, and a processor configured for:
   a-1) controlling intensity of energy from the energy source as the energy is directed to the medium; and/or
   a-2) adjusting sensitivity of the CCD linear image array as the energy source is directed to the medium; and/or
   a-3) adjusting a shutter speed of the CCD linear image array as the energy source is directed to the medium;
   b) monitoring the intensity of reflections of the energy from the medium onto the CCD linear image array; and,
   c) substantially preventing the measured energy reflections of step b) from saturating or entering any other undesirable state, wherein the energy reflections have a peak reflection having a center; and
   d) substantially preventing the center of the peak reflection and/or the peak reflection itself from shifting onto one or more adjacent pixel elements in the CCD linear image array.

45. The apparatus of claim 44, wherein the processor is configured to resolve an average thickness by taking the mathematical average of any, or all, of the sensor elements comprising the peak reflection.

46. The apparatus of claim 45, wherein the processor is configured for determining an average thickness by measuring the weighted average from the intensity of any, or all, of the sensor elements.

47. The apparatus of claim 45, wherein the processor is configured for finding the center of the reflected peak by determining one or more locations of the sensor elements in the CCD linear image array.

48. The apparatus of claim 44, wherein the processor is configured for allowing each sensor element's excess energy to be transferred to one or more adjacent sensor elements.

49. The apparatus of claim 44, wherein the processor is configured for controlling the amount of time the energy source directs energy onto the medium.

50. The apparatus of claim 44, wherein the processor is configured to substantially prevent the measured reflections on the CCD linear image array from saturating the CCD linear image array at particular locations on the CCD linear image when the thickness measurement is being performed.

51. The apparatus of claim 44, wherein the processor is configured for substantially preventing the center of the peak reflection to shift on the CCD linear image array.

52. The apparatus of claim 44, wherein the CCD linear image array comprises a CCD linear image array configured to allow each sensor element's excess energy to be transferred to an adjacent sensor element.

53. The apparatus of claim 44, including a processor configured for measuring an average width of a gap between adjacent mediums.

54. The method of claim 2, wherein the method includes measuring the medium thickness and/or the gap width using a charge coupled device (CCD) linear image array having a plurality of sensor elements, and the method further includes regulating energy carryover effects from one sensor element to another sensor element in the CCD linear image array.

55. The method of claim 54, wherein the method includes:
   a) regulating energy carryover effects by:
      a-1) controlling intensity of energy from an energy source as the energy is directed to the medium; and/or
      a-2) adjusting sensitivity of the CCD linear image array as the energy source is directed to the medium; and/or
      a-3) adjusting shutter speed of the CCD linear image array as the energy source is directed to the medium;
   b) monitoring the intensity of reflections of the energy from the medium onto the CCD linear image array; and,
   c) substantially preventing the measured energy reflections of step b) from saturating or entering any other undesirable state, wherein the energy reflections have a peak reflection having a center, and
   d) substantially preventing the center of the peak reflection and/or the peak reflection itself from shifting onto one or more adjacent pixel elements in the CCD linear image array when the measurement is performed.

56. The apparatus of claim 19, wherein the thickness-measuring sensor comprises a charge coupled device (CCD) linear image array comprised of a plurality of sensor elements, the CCD linear image array being configured to regulate energy carryover effects from one sensor element to another sensor element.

57. The apparatus of claim 56, wherein the processor is configured for:
   a-1) controlling intensity of energy from the energy source as the energy is directed to the medium; and/or
   a-2) adjusting sensitivity of the CCD linear image array as the energy source is directed to the medium; and/or
   a-3) adjusting a shutter speed of the CCD linear image array as the energy source is directed to the medium;
   b) monitoring the intensity of reflections of the energy from the medium onto the CCD linear image array; and,
   c) substantially preventing the measured energy reflections of step b) from saturating or entering any other undesirable state, wherein the energy reflections have a peak reflection having a center; and
   d) substantially preventing the center of the peak reflection and/or the peak reflection itself from shifting onto one or more adjacent pixel elements in the CCD linear image array.

* * * * *